(12) United States Patent
Coulombe et al.

(10) Patent No.: US 8,678,467 B2
(45) Date of Patent: Mar. 25, 2014

(54) WINDSHIELD MOUNTING SYSTEM

(75) Inventors: Alexandre Coulombe, Saint-Germain de Grantham (CA); Alexandre Cloutier, St.-Charles-de-Drummond (CA); Marc-Andre Patry, Drummondville (CA); Vincent Morin, Drummondville (CA); Benoit Lauziere, Drummondville (CA); Genevieve Therrien, St.Joachim-de-Courval (CA); Genevieve Demers, Drummondville (CA)

(73) Assignee: Soucy International Inc., Drummondville (CA)

( * ) Notice: Subject to any disclaimer, the term of this patent is extended or adjusted under 35 U.S.C. 154(b) by 11 days.

(21) Appl. No.: 13/183,496

(22) Filed: Jul. 15, 2011

(65) Prior Publication Data

US 2013/0015676 A1 Jan. 17, 2013

(51) Int. Cl.
*B60J 1/02* (2006.01)

(52) U.S. Cl.
USPC ...................................... 296/78.1; 296/96.21

(58) Field of Classification Search
USPC ........................ 296/77.1, 78.1, 96.21, 96.11
See application file for complete search history.

(56) References Cited

U.S. PATENT DOCUMENTS

| 5,732,965 A * | 3/1998 | Willey ...................... 280/288.4 |
| 7,104,585 B2 * | 9/2006 | Miura et al. ................. 296/78.1 |
| 7,654,550 B2 * | 2/2010 | Chuang ...................... 280/288.4 |
| 2005/0011921 A1 * | 1/2005 | Yang ............................ 224/425 |

* cited by examiner

Primary Examiner — Glenn Dayoan
Assistant Examiner — Melissa A Black
(74) Attorney, Agent, or Firm — Francois Cartier; Robert Brouillette; Brouillette & Partners

(57) ABSTRACT

A system for mounting a windshield to a small vehicle such as an all-terrain vehicle ("ATV"), a utility-terrain vehicle ("UTV"), or a snowmobile is disclosed. The system typically comprises a pair of receiving elements, each of them configured to be secured to the vehicle, typically the handlebar(s) thereof, and a corresponding pair of mounting elements secured to a windshield panel or panel assembly and configured to be respectively releasably received in the receiving elements. Each receiving element comprises a rotatable cam and each mounting element comprises a groove on an outwardly extending protrusion such that the cams can selectively engage the grooves in a locking engagement when the mounting elements are received in the receiving elements.

21 Claims, 7 Drawing Sheets

WINDSHIELD MOUNTING SYSTEM

CROSS-REFERENCE TO RELATED APPLICATIONS

There are no cross-related applications.

FIELD OF THE INVENTION

The present invention generally relates to mounting systems and support assemblies for securing a windshield to a vehicle. More particularly, the present invention relates to quick-release windshield mounting systems and support assemblies for small vehicles such as all-terrain vehicles ("ATV" or "ATVs"), utility-terrain vehicles ("UTV" or "UTVs"), snowmobiles and other similar vehicles.

BACKGROUND OF THE INVENTION

Nowadays, there are an ever-increasing number of people which enjoy riding all-terrain vehicles and other similar off-road vehicles, either in trails specifically designed for this activity or even on totally uncharted terrain.

In order to adapt the vehicles to the increasing variety of terrains onto which they are ridden, companies have long been offering after-market accessories such as support racks, supplementary seats, trailer hitches, track systems and so on.

Since these vehicles are generally subjected to shocks and vibrations, it is important that the accessories mounted to the vehicles be relatively fixedly mounted in order to prevent accidental failure or removal during use.

In the particular case of windshields, this is of utmost importance since the windshield generally protects the rider of the vehicle. Nevertheless, on some occasions, it is practical to be able to remove the windshield, at least temporarily, in order to avoid damage or for space considerations. For example, when there are low branches partially blocking a trail or when the vehicle must be stored or loaded onto a trailer for transport.

Several windshield mounting systems have thus been proposed. However, most mounting systems require the use of tools to install and to remove the windshield panel. With these windshield mounting systems, the process of installing or removing the windshield panel can be long and even impossible when the required tools are not available.

More recently, in order to mitigate the aforementioned shortcomings, some quick-release windshield mounting systems have been proposed, allowing the quick installation and removal of the windshields without the use of tools. Examples of such quick-release windshield mounting systems can be seen in U.S. Pat. Nos. 7,044,530; 7,360,819; and 7,543879.

However, despite ongoing developments in the field of windshield mounting systems and more particularly in the field of quick-release windshield mounting systems, there is still a need for an improved mounting system which would allow quick and easy installation and removal of a windshield onto a small vehicle without the need for tools.

SUMMARY OF THE INVENTION

In accordance with the principles of the present invention, a quick-release windshield mounting system is provided. As used hereinabove and hereinafter, the term windshield panel must be construed broadly such as to encompass, in addition to regular windshield panel, any other similar apparatuses or assemblies.

The windshield mounting system in accordance with the principles of the present invention generally comprises at least one but preferably a pair of receiving elements configured to be fixedly mounted to the front portion of the vehicle. Typically, but not necessarily, the receiving elements are configured to be mounted to the steering assembly of the vehicle and more particularly to the handle bar, or bars, thereof.

The windshield mounting system also comprises at least one but preferably a pair of mounting elements secured to a windshield panel and configured to be respectively releasably coupled to the receiving elements Each receiving element generally comprises a receiving cavity extending into the receiving element. The receiving cavity is configured to receive a substantially complementary protrusion outwardly extending from the mounting element.

In that sense, each mounting element generally comprises the outwardly extending protrusion mentioned above and a connecting portion configured to be secured to the windshield panel.

To secure the mounting element to the receiving element, the receiving element is provided with a rotatable latch having a cam configured to selectively engage, and disengage, a groove in the protrusion of the mounting element. To position the cam in and out of engagement with the groove of the protrusion, the latch comprises an arm which extends from the cam such that the cam can be actuated (e.g. pivoted) by the user of the vehicle.

Hence, by simply actuating the cam arms of the latches, the windshield panel can easily be installed, or removed, from the vehicle, without the need for tools.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel windshield mounting system will be described hereinafter. Although the invention is described in terms of specific illustrative embodiments, it is to be understood that the embodiments described herein are by way of example only and that the scope of the invention is not intended to be limited thereby.

Figure 1:
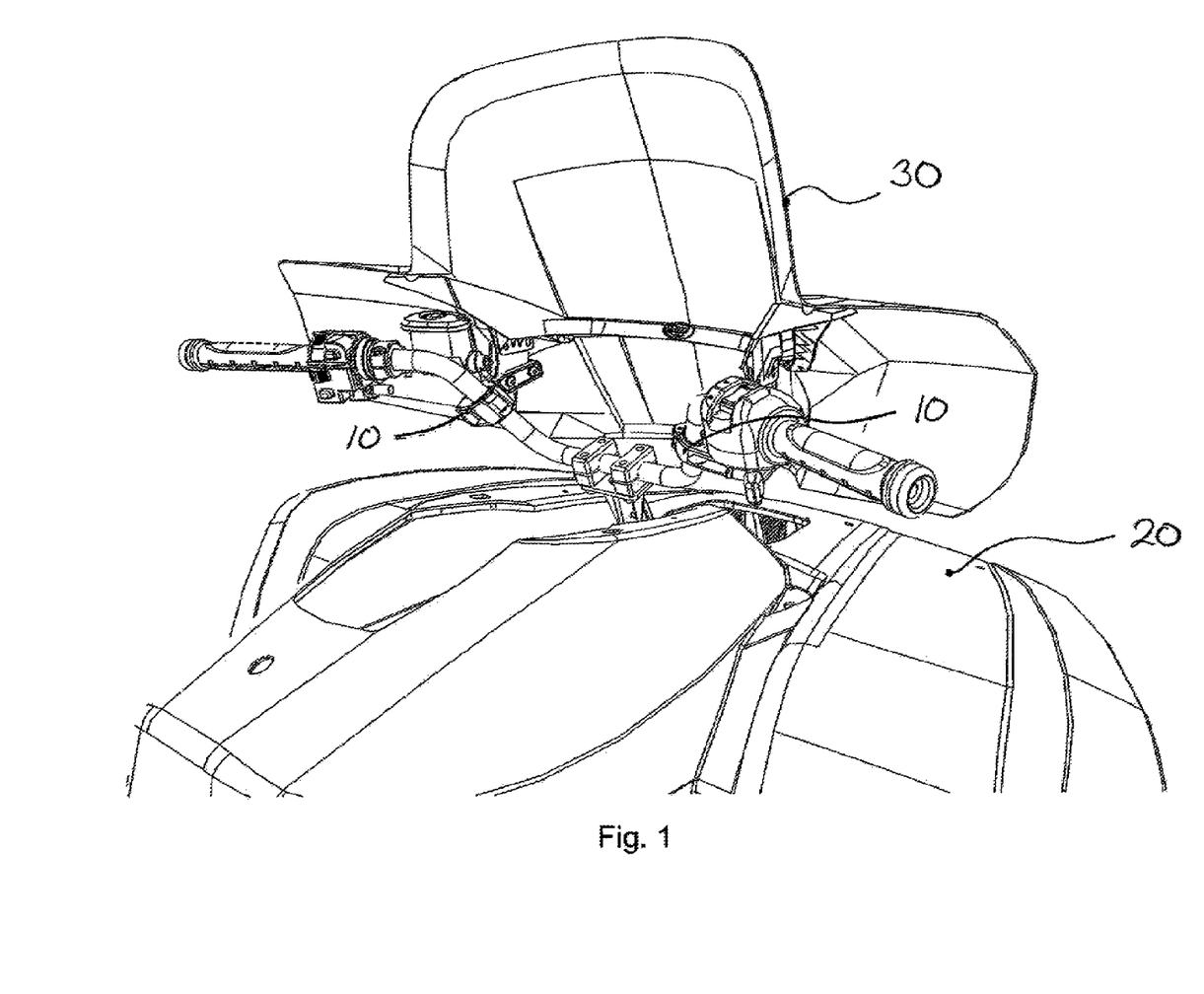
FIG. 1 is a perspective view of an exemplary ATV equipped with an embodiment of a windshield mounting system in accordance with the principles of the present invention.

Referring first to FIG. 1, a windshield mounting system 10, in accordance with the principles of the present invention, is configured to allow the rapid installation and removal of a windshield panel 30 to and from a small vehicle, such as an ATV 20.

Figure 2:
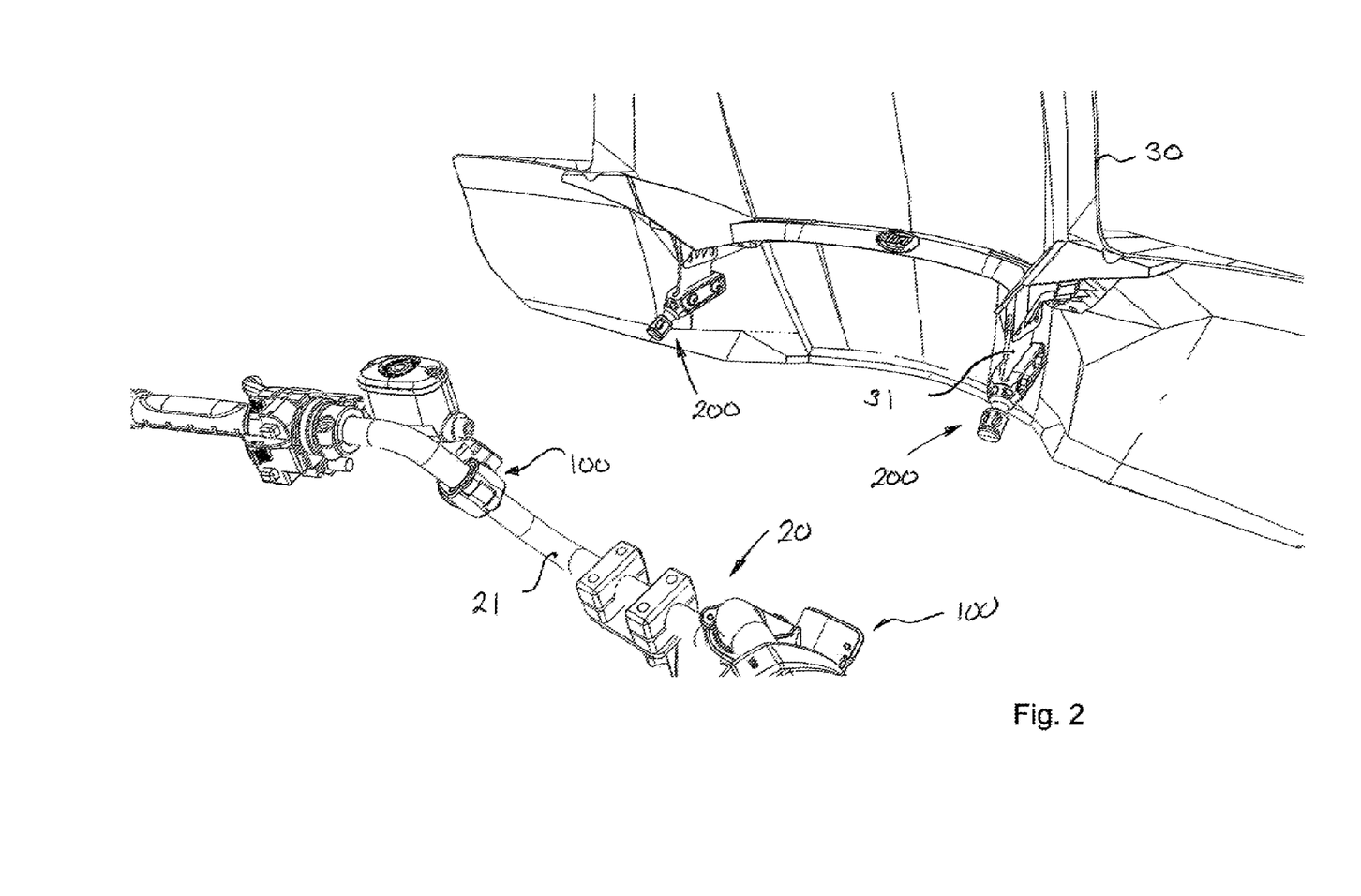
FIG. 2 is a perspective view of the windshield mounting system of FIG. 1, in an unconnected state.
Figure 3:
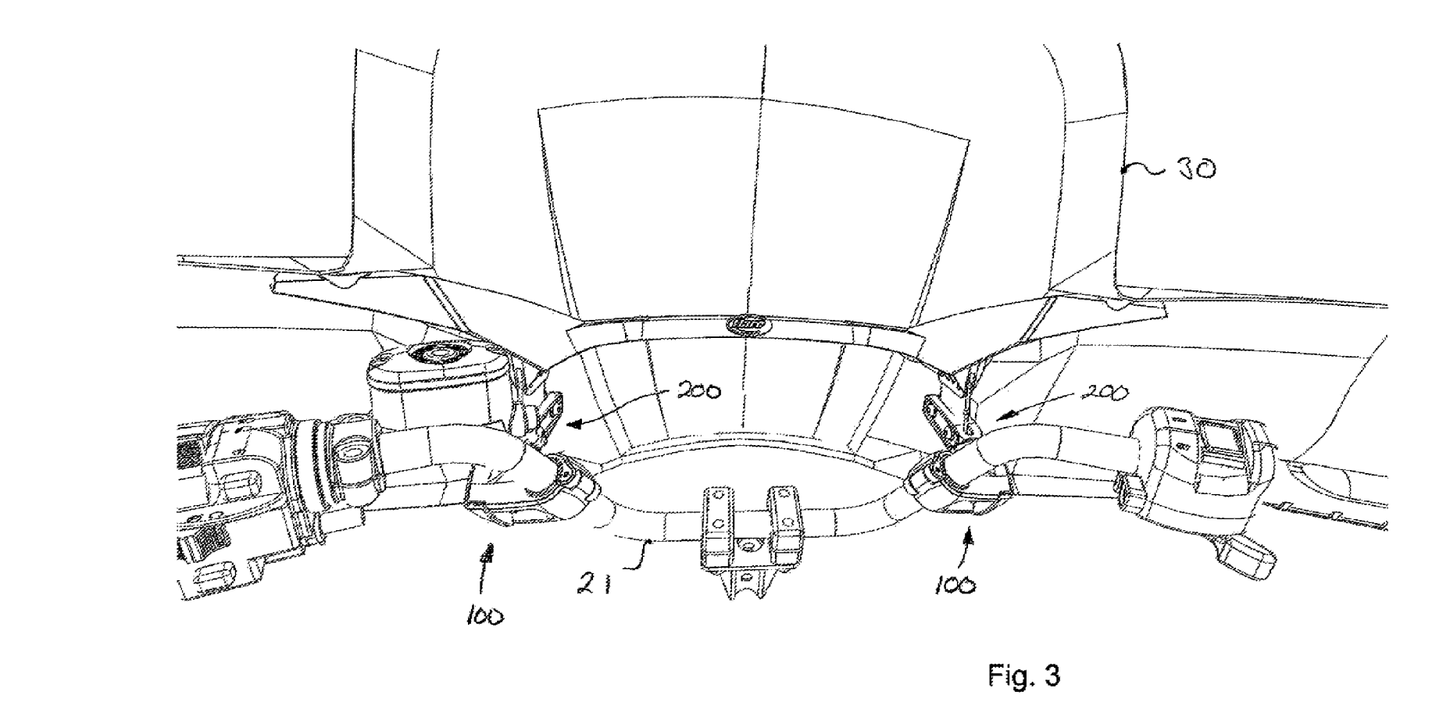
FIG. 3 is a perspective view of the windshield mounting system of FIG. 1, in a connected state.

Referring now to FIGS. 2 and 3, in the present embodiment, the windshield mounting system 10 typically comprises a pair of receiving elements 100 and a pair of mounting elements 200. As it will be explained in more details below, the mounting elements 200 are configured to be respectively releasably received in the receiving elements 100.

The receiving elements 100 are configured to be mounted to the front or forward portion of the vehicle 20, typically to the handle bar(s) 21 thereof.

For their parts, the mounting elements 200 are configured to be mounted to the windshield panel 30. Understandably, the windshield panel 30 could be unitary or be made from a plurality of components.

Due to the inherent substantial symmetry of the vehicle 20 and of the windshield panel 30 with respect to a longitudinal axis of the vehicle 20, the left and right receiving elements 100 and left and right mounting elements 200 are also symmetrical in nature. Hence, even though only one receiving element 100 and only one mounting element 200 will be described below, the description equally applied to both left and right receiving elements 100 and mounting elements 200.

Figure 4:
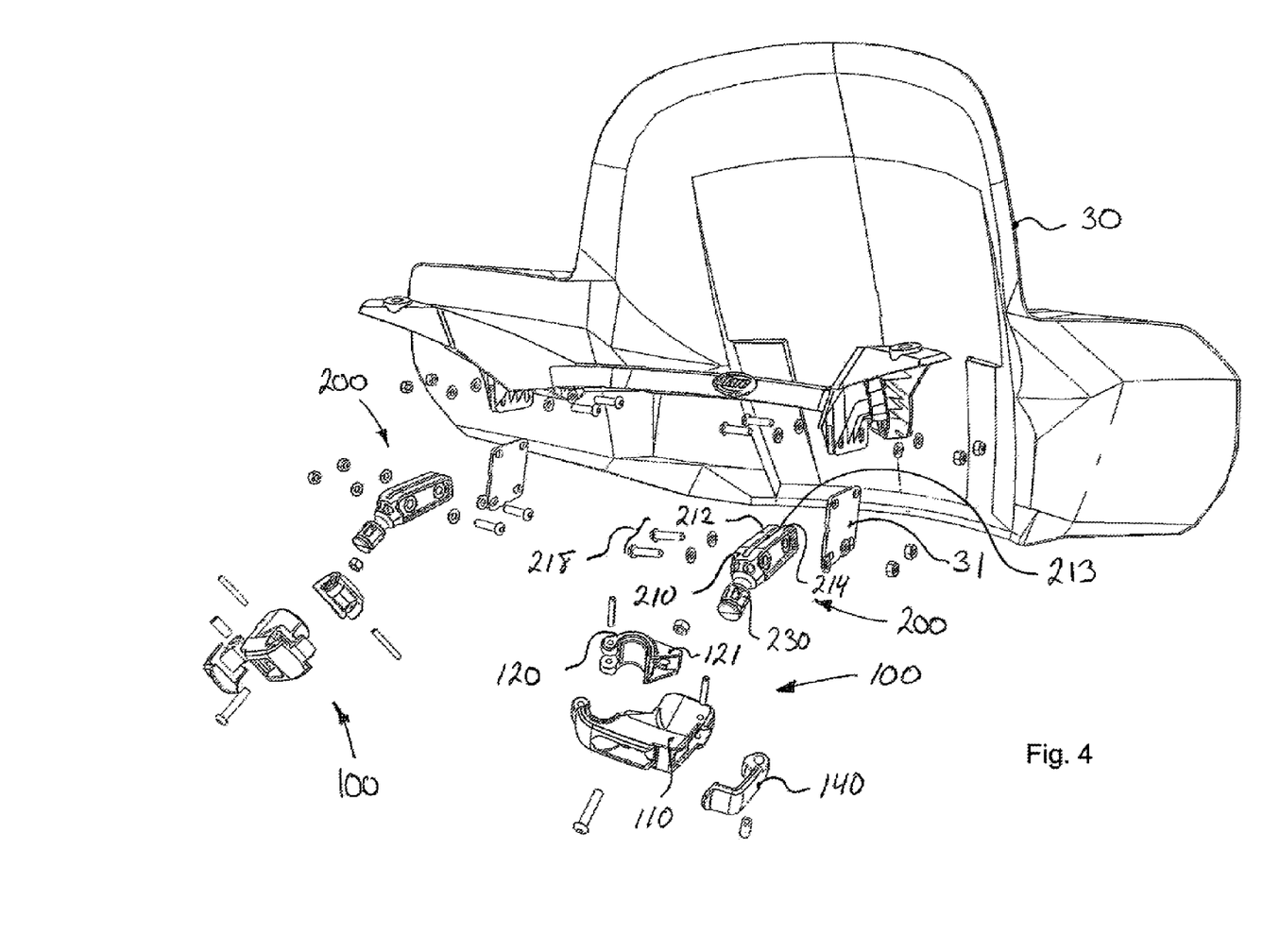
FIG. 4 is a perspective exploded view of the windshield mounting system of FIG. 1.
Figure 5A:
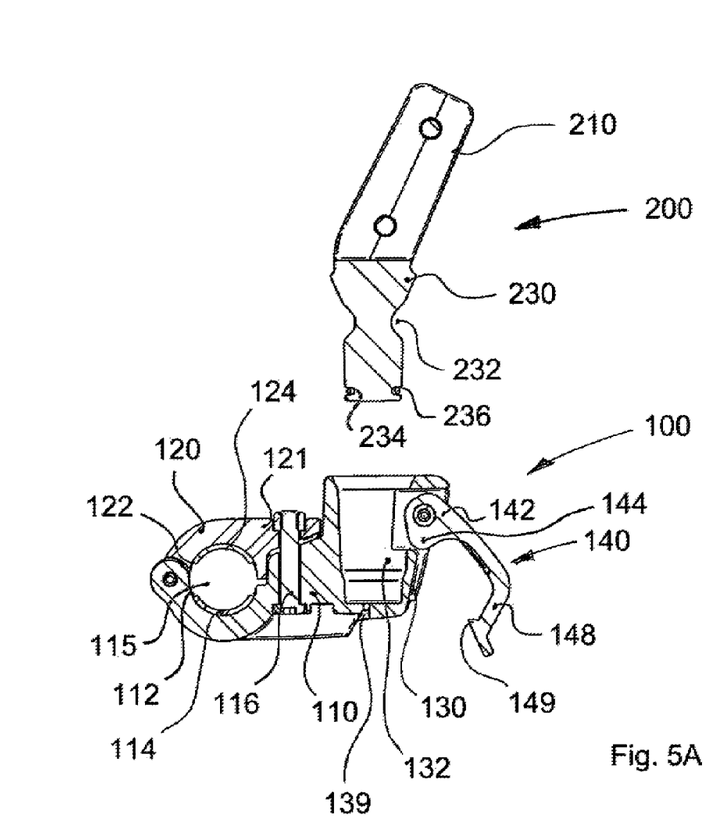
FIGS. 5A to 5C are cross-sectional side views of the windshield mounting system of FIG. 1, showing the mounting sequence.

With reference to FIGS. 4 and 5A, the right receiving element 100 and the right mounting element 200 will be described in more details.

The receiving element 100 generally comprises a first or coupling portion 110 and a second or receiving portion 130.

The first portion 110 is configured to mate with the handle bar 21 of the vehicle 20. In that sense, a coupling member 120 is pivotally mounted to the first portion 110 and is configured to form, with the first portion 110, a substantially cylindrical opening 115. In that sense, the first portion 110 comprises a semi-cylindrical region 112 and similarly, the coupling member 120 also comprises a semi-cylindrical region 122 which, with the semi-cylindrical region 112, define the cylindrical opening 115 as shown in FIG. 5A.

Understandably, the opening 115 should be sized to properly circumscribe the handle bar 21 of the vehicle 20.

Referring to FIG. 5A, to provide a better engagement between the opening 115 and the handle bar 21, the semi-cylindrical region 112 and the semi-cylindrical region 122 are respectively provided with layers 114 and 124 of resilient friction and typically elastomeric material such as, but not limited to, rubber. The layers 114 and 124 typically prevent the receiving element 100 from rotating about the handle bar 21 during use.

Referring back to FIGS. 4 and 5A, to secure the coupling member 120 to the first portion 110, the free end 121 of the coupling member 120 is fastened to the first portion 110, typically via a bolt and nut assembly 116. Understandably, the receiving element 100 is typically configured to be more or less permanently mounted to the handle bar 21.

For its part, the second portion 130 of the receiving element 100 is configured to receive the mounting element 200. In that sense, the second portion 130 comprises a receiving cavity 132 extending into the second portion 130.

In the present embodiment, the receiving cavity 132 is slightly tapered and has a substantially circular cross-section such as to broadly define a frustro-conical configuration. This configuration allows the insertion of the protrusion 230, described below, with more ease. Other configurations are however possible.

To secure the protrusion 230 once received into the cavity 132, the second portion 130 comprises a latch 140 pivotally mounted thereto and at least partially extending into the cavity 132. The latch 140 generally comprises a cam 142 and an arm 148 extending therefrom.

As it will be described below, the cam 142 comprises an extension 144 which is configured to engage the protrusion 230. Understandably, the cam 142 is pivoted by actuating the arm 148, typically by the fingers of the user.

Still referring to FIGS. 4 and 5A, the mounting element 200 will be described.

The mounting element 200 generally comprises a connecting portion 210 configured to be fixedly mounted to the windshield panel 30, and the protrusion 230 already introduced.

In the present embodiment, the connecting portion 210 is generally configured as a fork and comprises two substantially parallel fingers 212 and 214 defining a space 213 therebetween. The fingers 212 and 214 and the space 213 are configured to receive a plate 31 (or plate portion) extending from the windshield panel 30. The plate 31 is fastened to the mounting portion 210, typically via a bolt and nut assembly 218.

Understandably, the configuration of the connecting portion 210 could be different to accommodate other configurations of windshield panels.

The protrusion 230, which extends form the mounting portion 210, is configured to be received into the receiving cavity 132 of the second portion 130 of the receiving element 100. In that respect, the protrusion 230 is provided with a notch or groove 232. This groove 232 is typically sized to accommodate the cam extension 144.

In the present embodiment, the groove 232 fully circumscribes the protrusion 230. However, in other embodiments, the groove 232 could only partially extend along the perimeter or circumference of the protrusion 230.

Also, in the present embodiment, the protrusion 230 is slightly tapered and has a substantially circular cross-section. Hence, as best shown in FIGS. 2 and 4, in the present embodiment, the protrusion 230 is generally of frustro-conical configuration.

Combined with the tapered and substantially circular receiving cavity 132, the protrusion 230 can be relatively easily inserted into the cavity 132. In that sense, the tapered shape of the protrusion 230 and of the cavity 132 assists the user in aligning the protrusions 230 into the receiving cavities 132 of the receiving elements 100.

Referring to FIG. 5A, in the present embodiment, a substantially circular and elastomeric resilient ring 236 (e.g. elastomeric O-ring) is mounted to the protrusion 230, in a small circumferential groove 234, typically located near the free extremity of the protrusion 230. This resilient ring 236 generally provides adequate tightening between the protrusion 230 and the receiving cavity 132 (see also FIGS. 5B and 5C).

Figure 5B:
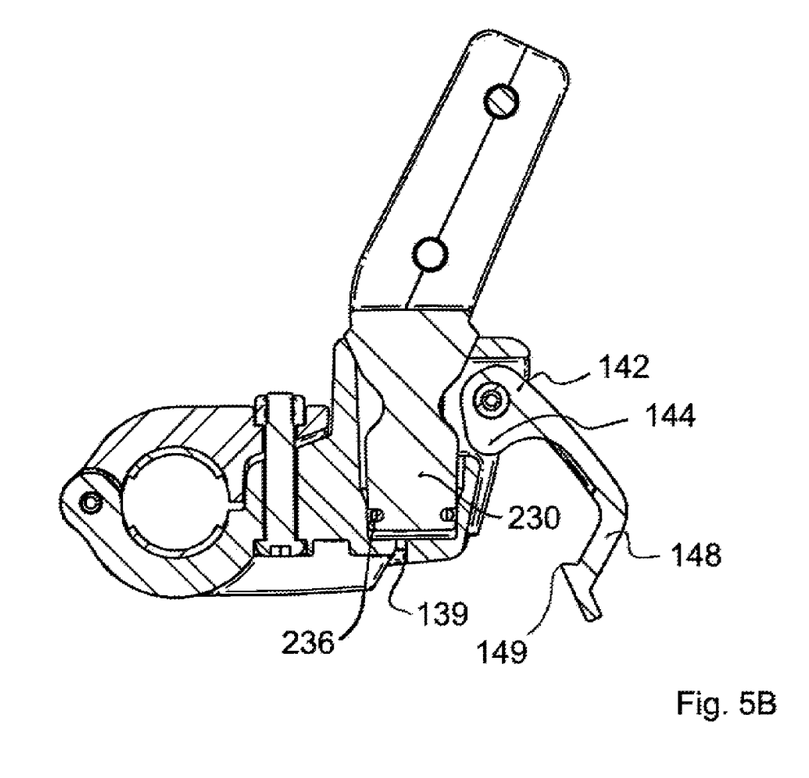
Figure 5C:
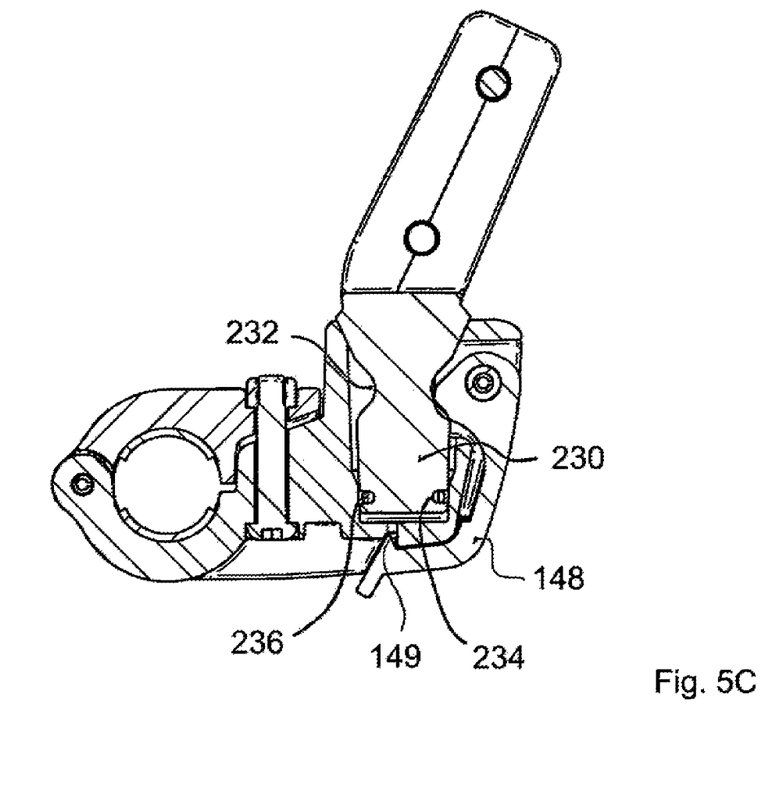

Referring now to FIGS. 5A to 5C, a method for installing, and removing the mounting elements 200, secured to the windshield panel 30, into the receiving elements 100, secured to the vehicle 20, will be described.

Referring first to FIGS. 5A and 5B, the protrusions 230 of the mounting elements 200 are first inserted into the receiving cavities 132 of the receiving elements 100. During the insertion, the latches 140 are in an open or unlocked position, i.e. the extensions 144 do not protrude inside the receiving cavities 132.

Referring now to FIGS. 5B and 5C, once the protrusions 230 are fully inserted in their respective receiving cavities 132, the latches 140 are then pivoted into a closed or locked position. In the locked position, the extensions 144 of the cams 142 protrude inside the receiving cavities 132 and into the grooves 232 of the protrusions 230, thereby locking the protrusions 230 into the receiving cavities 132.

At this point, as best illustrated in FIG. 5C, to prevent the accidental unlocking of the latches 140, the arms 148 are typically each provided with a small projection or hook 149 configured to be snapped in a small notch 139 provided in each of the receiving portions 130.

To remove the mounting elements 200 from the receiving elements, the aforementioned method is performed in reverse.

The windshield mounting system 10 in accordance with the principles of the present invention therefore allows the user of a vehicle 20 to quickly install, and remove, a windshield panel 30 on his or her vehicle 20 without the needs for tools.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A windshield mounting system for mounting a windshield panel to a vehicle, the windshield mounting system comprising:
   a) a receiving element configured to be mounted to the vehicle, the receiving element comprising a receiving cavity and a latch mounted thereto, the receiving cavity being of frustro-conical configuration, the latch being pivotable between a locked position and an unlocked position;
   b) a mounting element configured to be mounted to the windshield panel, the mounting element comprising an outwardly extending protrusion configured to be releasably received into the receiving cavity of the receiving element, the protrusion being of frustro-conical configuration, the protrusion comprising a first groove and a second groove, the first groove being configured to be selectively engaged by the latch when the protrusion is received into the receiving cavity, the second groove fully circumscribing the protrusion and receiving therein a resilient ring.

2. A windshield mounting system as claimed in claim 1, wherein the latch comprises a cam and an arm extending from the cam.

3. A windshield mounting system as claimed in claim 2, wherein the cam comprises an extension configured to extend into and engage the first groove when the latch is in the locked position, and configured to extend outside the first groove when the latch is in the unlocked position.

4. A windshield mounting system as claimed in claim 2, wherein the arm comprises a projection configured to be received into a notch provided in the receiving element.

5. A windshield mounting system as claimed in claim 1, wherein the first groove fully circumscribes the protrusion.

6. A windshield mounting system as claimed in claim 1, wherein the second groove is located near a free extremity of the protrusion.

7. A vehicle having mounted thereto a windshield assembly using a windshield mounting system as claimed in claim 1.

8. A windshield mounting system for mounting a windshield assembly to a vehicle, the windshield mounting system comprising:
   a) a receiving element configured to be mounted to the vehicle, the receiving element comprising a receiving cavity and a latch pivotally mounted thereto, the receiving cavity being of frusro-conical configuration, the latch comprising a cam and being actionable between a locked position and an unlocked position;
   b) a mounting element configured to be secured to the windshield assembly, the mounting element comprising an outwardly extending protrusion configured to be releasably received into the receiving cavity of the receiving element, the protrusion being of frustro-conical configuration, the protrusion comprising a first groove and a second groove, the first groove being configured to receive the cam, the second groove fully circumscribing the protrusion and receiving therein a resilient ring
   wherein when the protrusion is received into the cavity, the cam extends into the first grooved when the latch is in the locked position, and the cam does not extend into the first groove when the latch is in the unlocked position.

9. A windshield mounting system as claimed in claim 8, wherein the latch comprises an arm extending from the cam.

10. A windshield mounting system as claimed in claim 9, wherein the arm comprises a projection configured to be received into a notch provided in the receiving element.

11. A windshield mounting system as claimed in claim 8, wherein the first groove fully circumscribes the protrusion.

12. A windshield mounting system as claimed in claim 8, wherein the second groove is located near a free extremity of the protrusion.

13. A vehicle having mounted thereto a windshield assembly using a windshield mounting system as claimed in claim 8.

14. A windshield mounting system for mounting a windshield assembly to a vehicle, the windshield mounting system comprising:
   a) a first receiving element configured to be mounted to the vehicle, the first receiving element comprising a first receiving cavity and a first latch pivotally mounted thereto, the first receiving cavity being of frustro-conical configuration, the first latch comprising a first cam and being actionable between a locked position and an unlocked position;
   b) a second receiving element configured to be mounted to the vehicle, the second receiving element comprising a second receiving cavity and a second latch pivotally mounted thereto, the second receiving cavity being of frustro-conical configuration, the second latch comprising a second cam and being actionable between a locked position and an unlocked position;
   c) a first mounting element configured to be secured to the windshield assembly, the first mounting element comprising a first outwardly extending protrusion adapted to be releasbly received into the first receiving cavity of the first receiving element, the first protrusion being of frustro-conical configuration, the first protrusion comprising a first groove and a second groove, the first groove being adapted to receive the first cam, the second groove fully circumscribing the first protrusion and receiving therein a first resilient ring;
   d) a second mounting element configured to be secured to the windshield assembly, the second mounting element comprising a second outwardly extending protrusion adapted to be releasably received into the second receiving cavity of the second receiving element, the second protrusion being of frustro-conical configuration, the second protrusion comprising a third groove and a fourth groove, the third groove being configured to receive the second cam, the fourth groove fully circumscribing the second protrusion and receiving therein a second resilient ring;

wherein the first protrusion is received into the first cavity, the first cam extends into the first groove when the latch is in the locked position, and the first cam does not extend into the first groove when the first latch is in the unlocked position; and wherein when the second protrusion is received into the second cavity, the second cam extends into the third groove when the second latch is in the locked position, and the second cam does not extend into the third groove when the second latch is in the unlocked position.

15. A windshield mounting system as claimed in claim 14, wherein the first latch comprises a first arm extending from the first cam, and wherein the second latch comprises a second arm extending from the second cam.

16. A windshield mounting system as claimed in claim 15, wherein the first arm comprises a first projection configured to be received into a first notch provided in the first receiving element, and wherein the second arm comprises a second projection configured to be received into a second notch provided in the second receiving element.

17. A windshield mounting system as claimed in claim 14, wherein the first groove fully circumscribes the first protrusion.

18. A windshield mounting system as claimed in claim 14, wherein the first groove fully circumscribes the first protrusion and wherein the third groove fully circumscribes the second protrusion.

19. A windshield mounting system as claimed in claim 14, wherein the second groove is located near a free extremity of the first protrusion.

20. A windshield mounting system as claimed in claim 14, wherein the second groove is located near a free extremity of the first protrusion, and wherein the fourth groove is located near a free extremity of the second protrusion.

21. A vehicle having mounted thereto a windshield assembly using a windshield mounting system as claimed in claim 14.

* * * * *